(12) United States Patent
Cirinna' et al.

(10) Patent No.: US 12,546,679 B2
(45) Date of Patent: Feb. 10, 2026

(54) SYSTEM FOR SENSING AND RECOGNIZING ACOUSTIC AND/OR VIBRATIONAL ANOMALIES ASSOCIATED WITH A SITE TO BE MONITORED

(71) Applicant: LEONARDO S.P.A., Rome (IT)

(72) Inventors: Fabio Cirinna', Rome (IT); Andrea Giorgio Busa', Rome (IT)

(73) Assignee: LEONARDO S.P.A., Rome (IT)

(*) Notice: Subject to any disclaimer, the term of this patent is extended or adjusted under 35 U.S.C. 154(b) by 283 days.

(21) Appl. No.: 18/283,469

(22) PCT Filed: Mar. 21, 2022

(86) PCT No.: PCT/IB2022/052554
§ 371 (c)(1),
(2) Date: Sep. 22, 2023

(87) PCT Pub. No.: WO2022/200994
PCT Pub. Date: Sep. 29, 2022

(65) Prior Publication Data
US 2024/0167911 A1 May 23, 2024

(30) Foreign Application Priority Data
Mar. 24, 2021 (IT) .................. 102021000007157

(51) Int. Cl.
*G01M 7/02* (2006.01)
*G01H 9/00* (2006.01)
*G08B 21/18* (2006.01)

(52) U.S. Cl.
CPC ............ *G01M 7/025* (2013.01); *G01H 9/004* (2013.01); *G08B 21/18* (2013.01)

(58) Field of Classification Search
None
See application file for complete search history.

(56) References Cited

U.S. PATENT DOCUMENTS

| 2018/0080812 A1* | 3/2018 | Wu | G01H 9/004 |
| 2020/0190971 A1* | 6/2020 | Thiruvenkatanathan | G01V 1/288 |

\* cited by examiner

*Primary Examiner* — Eric S. McCall
*Assistant Examiner* — Nigel H Plumb
(74) *Attorney, Agent, or Firm* — ArentFox Schiff LLP; Michael Fainberg

(57) ABSTRACT

The disclosure relates to a system for sensing and recognizing acoustic and/or vibrational anomalies. The system comprises: a unit using optical fiber for the distributed acoustic and/or vibrational sensing of at least one acoustic and/or vibrational anomaly and for generating an alarm signal representative of the sensing of such at least one anomaly; one or more acoustic-electric transducers to sense one or more ambient audio signals associated with the at least one acoustic and/or vibrational anomaly and to convert such ambient audio signals into electrical signals; an audio classifier module configured to classify the electrical signals generated based on at least one algorithm for data analysis and machine learning of information from the data, to generate a classification signal; a correlator module configured to receive the alarm signal and the classification signal and to compare such signals to generate a qualified alarm signal.

16 Claims, 3 Drawing Sheets

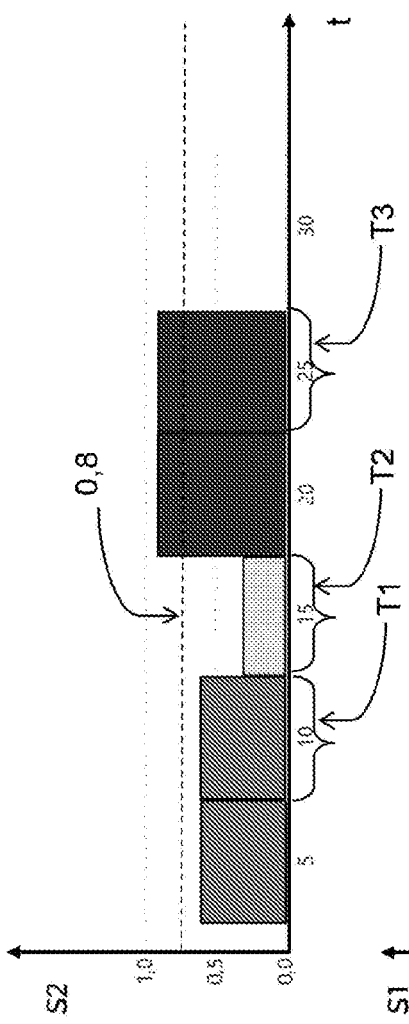
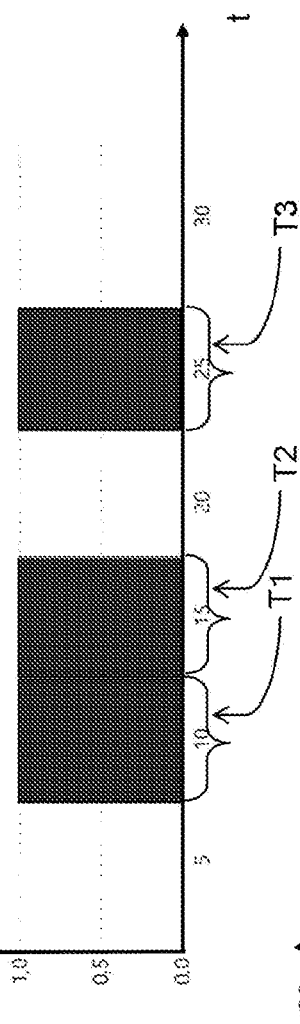
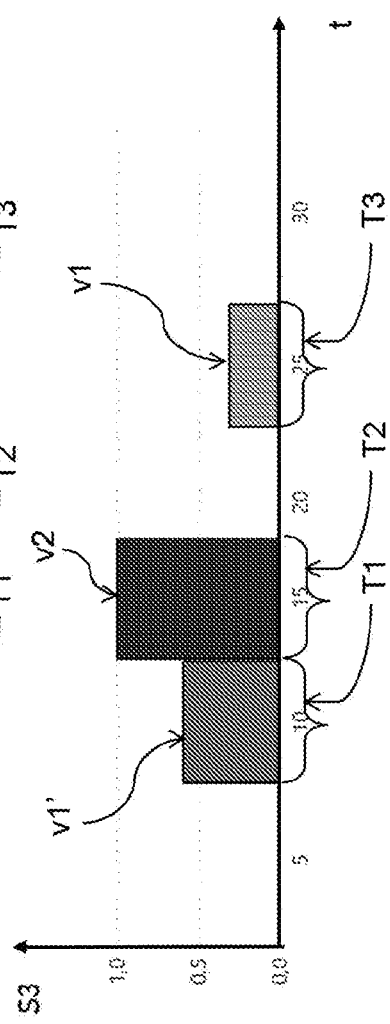

SYSTEM FOR SENSING AND RECOGNIZING ACOUSTIC AND/OR VIBRATIONAL ANOMALIES ASSOCIATED WITH A SITE TO BE MONITORED

CROSS-REFERENCE TO RELATED APPLICATIONS

This application is a National Phase Application of PCT International Application No. PCT/IB2022/052554, having an International Filing Date of Mar. 21, 2022 which claims priority to Italian Application No. 102021000007157 filed Mar. 24, 2021, each of which is hereby incorporated by reference in its entirety.

FIELD OF THE INVENTION

The present invention relates to a system for sensing and recognizing acoustic anomalies and/or vibrational anomalies associated with a site to be monitored, such as a pipe for the transport of fluids and gases, for example.

In particular, the system allows recognizing the acoustic and/or vibrational anomalies sensed by an alarm sensing and signaling unit of the DAS/DVS type by correlating the alarm information provided by such a DAS/DVS unit with ambient audio information associated with the anomalies to reduce false positives generated by the DAS/DVS unit itself.

BACKGROUND OF THE INVENTION

In systems designed to transport fluids and gases, such as oil pipelines or gas pipelines, for example, the need is strongly felt to sense fluid leaks (leak detection) in tubes or pipes.

Certain known methods currently used for sensing leaks in pipes for fluids use optical fibers. In particular, an optical fiber infrastructure for sensing leaks of the known type, operating for example according to the DAS (Distributed Acoustic Sensing) method or the DVS (Distributed Vibrating Sensing) method, is based on the analysis of acoustic/vibrational signals, the effects of which are conveyed through the optical fiber.

In particular, the DAS infrastructure provides for the installation of optical fiber cables parallel to the pipe to be monitored to create a real-time data collection system.

As is known, acoustic disturbances, as well as vibrations, generate microscopic strains and compressions of the optical fiber, which cause a change in the phase and amplitude of the optical wave conveyed in the fiber itself. In particular, vibrations caused by a fluid coming out of the pipe through a leak modify the features of the reflected wave, corresponding to the optical wave conveyed in the fiber, which may be sensed, thus allowing such a leak to be signaled. Moreover, the position of the leak along the pipe may be determined by measuring the time delay between the instant when the conveyed optical wave is emitted and the instant when the reflected wave is sensed.

However, such known infrastructures for sensing leaks in pipes have limits and drawbacks.

Indeed, DAS/DVS infrastructures are not very efficient when there are acoustic/vibrational disturbances due to human activities or ambient disturbances in the vicinity of the pipe for fluids to be monitored. Such a reduced efficiency is mainly due to the increased number of alarms for false positives generated by the DAS/DVS infrastructure.

The remedy normally implemented of calibrating these infrastructures in order to adjust the sensitivity thereof is entirely useless in certain cases and often forces the infrastructure operator to deactivate it. However, such a deactivation implies high costs for the infrastructure operator.

Therefore, the need is particularly felt to devise a solution which, using DAS/DVS infrastructures, allows discriminating the acoustic disturbances which are actually attributable to leaks in pipes for fluids in a more accurate manner, thus decreasing the alarms for false positives generated by such infrastructures.

SUMMARY OF THE INVENTION

It is the object of the present invention to devise and provide a system for sensing and recognizing acoustic anomalies and/or vibrational anomalies associated with a site to be monitored, for example a pipe for fluids, such as an oil pipeline or a gas pipeline, which allows at least partially obviating the drawbacks claimed above with reference to the above-mentioned known solutions.

The invention provides a system for sensing and recognizing acoustic and/or vibrational anomalies by means of a DAS/DVS infrastructure which is also configured to sense the ambient noise associated with such anomalies, in order to reduce the false positives generated by the DAS/DVS infrastructure within contexts characterized by external interference, such as human activities or ambient disturbances.

In particular, the system of the invention comprises:
one or more microphones;
an audio classifier module connected to such microphones;
a unit for sensing acoustic and/or vibrational anomalies, for example caused by fluid leaks from a pipe (leak detection), based on the DAS/DVS method;
a correlator module.

In an embodiment, an ambient audio signal acquired through the one or more microphones placed along the pipe for fluids to be monitored, is classified by Machine Learning or Deep Learning algorithms which use convolutional neural networks.

The alarms generated by the unit based on the DAS/DVS method correlated with an output signal generated by the classifier module of the ambient audio signal allows defining a severity level of such alarms.

For example, a low severity level is associated with the alarm generated by the DAS/DVS unit in the presence of the recognition by the audio classifier module of human activities or ambient noises on which such a module is trained.

In a preferred embodiment, in the presence of alarms generated by the DAS/DVS unit, the correlator module analyzes the output signal from the audio classifier module of ambient noise:
if there is a classified/recognized ambient noise, the correlator module generates a low severity alarm;
if there is an unclassified/unrecognized ambient noise, the correlator module generates a medium/high severity alarm.

In a further embodiment, the classifier module may be trained to classify ambient audio signals which are recognized as elements of interference for the DAS/DVS unit.

The object of the invention is achieved by a system for sensing and recognizing acoustic and/or vibrational anomalies according to claim 1.

Preferred embodiments of such a system are described in the dependent claims.

The present invention also relates to a method for sensing and recognizing acoustic anomalies and/or vibrational anomalies associated with a site to be monitored according to claim 12.

BRIEF DESCRIPTION OF THE DRAWINGS

Further features and advantages of the system and method according to the invention will become apparent from the following description of preferred embodiments, given by way of indicative, non-limiting examples, with reference to the accompanying drawings, in which:

FIGS. 3A-3C graphically show, as the time changes, an example of a classification signal, an alarm signal and a qualified alarm signal, respectively, of the system for sensing and recognizing acoustic and/or vibrational anomalies in FIG. 1.

In the aforesaid figures, equal or similar elements will be indicated by the same reference numerals.

DETAILED DESCRIPTION

Figure 1:
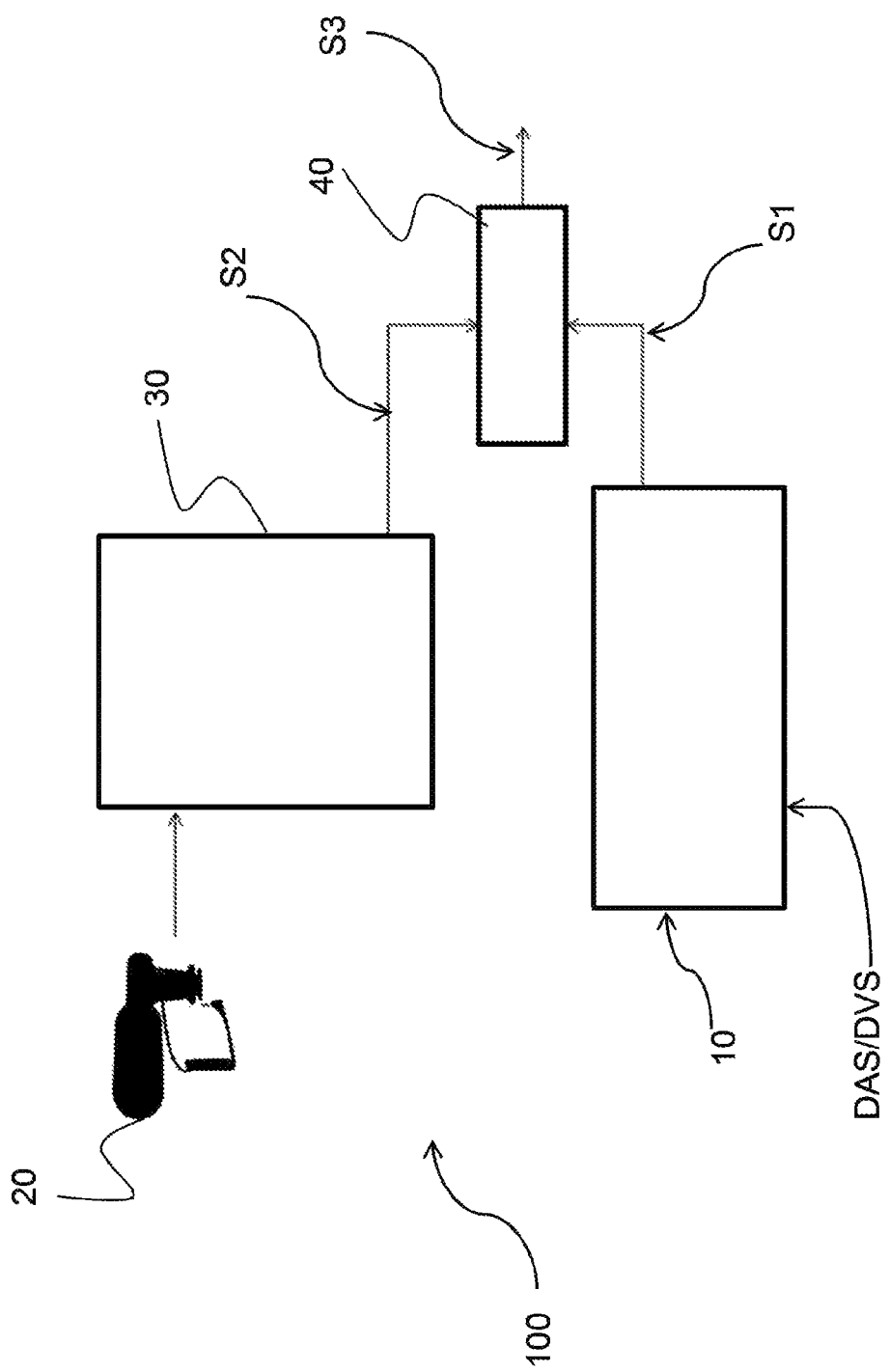
FIG. 1 uses a block diagram to show a system for sensing and recognizing acoustic anomalies and/or vibrational anomalies associated with a site to be monitored, according to the invention.

With reference to FIG. 1, the system for sensing and recognizing acoustic anomalies and/or vibrational anomalies associated with a site to be monitored according to the invention is indicated globally by numeral 100.

Such a system 100 for sensing and recognizing acoustic and/or vibrational anomalies is indicated below also as sensing and recognizing system or more simply, as system.

Preferably, but not limitedly, the expression "site" is used in the present description to indicate a pipe or a tube for the transport of fluids and gases, for example an oil pipeline or a gas pipeline, which requires monitoring. However, the present invention advantageously is also applicable to other types of sites or assets which may be monitored using the same infrastructure.

Moreover, the expressions "acoustic anomaly" or "vibrational anomaly" are used below to indicate acoustic/vibrational disturbances caused by human activities, for example noises caused by a moving mechanical means, an engine, and by similar ambient disturbances.

The sensing and recognizing system 100 of the invention comprises a unit 10 using optical fiber for the distributed acoustic sensing, DAS, and/or for the distributed vibrational sensing, DVS, of at least one acoustic and/or vibrational anomaly associated with such a site. In particular, unit 10 is embodied in an optical fiber infrastructure for sensing leaks (leak detection) along the pipe for the transport of fluids and gases, operating for example according to the DAS (Distributed Acoustic Sensing) method or the DVS (Distributed Vibrating Sensing) method.

As is known, such an optical fiber infrastructure operates to sense and signal alarms, such as leaks in pipes, for example, based on the analysis of the acoustic/vibrational signals, the effects of which are conveyed through the optical fiber.

In particular, such a DAS/DVS unit 10 is configured to generate an alarm signal S1 representative of the sensing of the aforesaid at least one acoustic and/or vibrational anomaly associated with the pipe for fluids or close to the pipe.

Moreover, the system 100 comprises one or more acoustic-electric transducers 20, in particular one or more microphones, operatively associated with the site to be monitored. Such acoustic-electric transducers 20 are configured to sense one or more ambient audio signals associated with the at least one acoustic and/or vibrational anomaly and to convert the aforesaid ambient audio signals into electrical signals.

Additionally, the system 100 of the invention comprises an audio classifier module 30 connected to the aforesaid one or more acoustic-electric transducers 20 and configured to classify the electrical signals generated by the transducers based on at least one algorithm for data analysis and machine learning of information from the data.

In an embodiment, such at least one algorithm for data analysis comprises a Machine Learning and/or Deep Learning algorithm based on Convolutional Neural Network (CNN).

In particular, the aforesaid audio classifier module 30 is configured to generate a classification signal S2 indicative of the fact that said at least one sensed acoustic and/or vibrational anomaly is included in a set of recognized anomalies or is an unknown acoustic and/or vibrational anomaly.

The sensing and recognizing system 100 further comprises a correlator module 40 configured to receive the aforesaid alarm signal S1 and classification signal S2 and to compare such an alarm signal S1 with the classification signal S2 during a sensing time interval T1 or T2 or T3.

It should be noted that such a sensing time interval comprises a time frame which contains the instant of time to which the alarm provided by the alarm signal S1 refers. In particular, FIGS. 3A, 3B and 3C depict a first T1, a second T2 and a third T3 sensing time intervals having the same duration, for example 5 seconds. The first sensing time interval T1 is centered at 10 seconds, the second time interval T2 is centered at 15 seconds, the third time interval T3 is centered at 25 seconds.

The audio classifier module 30 and the correlator module 40 of the system 100 of the invention preferably are software modules configured to be loaded in a memory, in particular of the non-volatile type, of a processing unit, for example the control unit of the alarm signals generated by the DAS/DVS unit 10.

Such software modules are configured to be executed by a respective processing unit (CPU or GPU) with which the aforesaid control unit is equipped.

Advantageously, the correlator module 40 is configured to generate a qualified alarm signal S3. Such a qualified alarm signal is configured to provide coded information indicative of the fact that the alarm signal S1 generated by the DAS/DVS unit 10 represents, in the sensing time interval T1, T2 or T3, a recognized acoustic and/or vibrational anomaly or an unknown acoustic and/or vibrational anomaly.

In other words, the system 100 of the invention comprises two distinct apparatuses or units for sensing the acoustic and/or vibrational anomalies associated with a same site to be monitored, i.e., an optical fiber apparatus of the DAS/DVS type, and a microphone apparatus 20 connected to a classifier 30.

As shown in FIG. 1, such apparatuses operate in parallel to provide different signals relative to a same site to be monitored to the correlator module 40 to allow the latter to discriminate whether the alarm signal S1 generated by the DAS/DVS optical fiber unit is actually representative of an alarm condition.

In other words, the qualified alarm signal S3 represents an enriched alarm signal which, following the sensing of an acoustic and/or vibrational anomaly, allows discriminating whether the alarm S1 generated by the DAS/DVS unit 10 was determined by a sound disturbance ascribable to a known human activity, thus being a low severity alarm, or whether it was determined by a sound disturbance which is not clearly known or is entirely unknown, thus being a medium/high severity alarm, i.e., requiring greater attention. For example, a sound disturbance unknown to the audio classifier 30, thus capable of generating a high severity alarm requiring greater attention, may be that associated with a leak in the pipe for fluids.

In the example in FIG. 3B, the alarm signal S1 sensed in the first T1, second T2 and third T3 time intervals has amplitude equal to one.

In a preferred embodiment, such a qualified alarm signal S3 is a signal which may be schematized by pulses of finite duration, for example rectangular pulses. Each of such pulses of finite duration of the qualified alarm signal S3 takes, based on the classification signal S2:
- a first amplitude value v1, v1', indicative of the fact that the alarm signal S1 is representative of a recognized acoustic and/or vibrational anomaly in the sensing time interval, for example in the first T1 or third T3 time interval;
- a second amplitude value v2, indicative of the fact that the alarm signal S1 is representative of an unknown acoustic and/or vibrational anomaly in the sensing time interval, for example in the second time interval T2.

With reference to FIGS. 3A, 3B and 3C, in an embodiment, the aforesaid classification signal S2 takes a discrete value, for example between one and zero, in the sensing time interval, in particular, in each of the three time intervals T1, T2 and T3. Such a discrete value taken on by the classification signal S2 is indicative a level of confidence in the classification. This allows determining whether the at least one sensed acoustic and/or vibrational anomaly is a recognized anomaly, such as the noise associated with a mechanical means or an engine, for example, or is an unknown anomaly.

In an alternative embodiment, the first amplitude value of the qualified alarm signal S3 with pulses is:
- a first amplitude v1 when the classification signal S2 takes a discrete value greater than 0.8 in the sensing time interval, for example in the third time interval T3;
- a further first amplitude v1' when the classification signal S2 takes a discrete value lower than 0.8 and greater than 0.5 in the sensing time interval, for example in the first time interval T1.

In a particular embodiment, the aforesaid first amplitude value v1, v1' of the qualified alarm signal S3 with pulses is lower than the second amplitude value v2.

With reference to the example in FIG. 3C, the qualified alarm signal S3 in each sensing time interval T1, T2, T3 may take amplitude values between zero and one. In particular, the first amplitude v1 is equal 0.6 and the further first amplitude v1' is equal to 0.3.

In an embodiment, the pulse of finite duration of the qualified alarm signal S3 takes the second amplitude value v2 when the classification signal S2 takes a discrete value lower than 0.5 in the sensing time interval, for example in the second time interval T2. In particular, in the example in FIG. 3C, the second amplitude value v2 of the qualified alarm signal S3 is equal to one.

With reference to the example in FIGS. 3A and 3B, as mentioned above, this means that the alarm signal S1 sensed by the DAS/DVS unit 10 in the second sensing time interval T2 is equal to a signal unknown to the audio classifier 30, therefore a signal requiring greater attention because associated, with increased probability, with a leak in the pipe monitored for fluids.

In a different embodiment, in the event of the failure for the correlator module 40 to receive the aforesaid classification signal S2, the correlator module 40 is configured to generate the qualified alarm signal S3 with pulses in which each of such pulses of finite duration takes the second amplitude value v2. In this case, the qualified alarm signal S3 again indicates a high severity alarm.

Examples of the information associated with the alarm signal S1, the classification signal S2 and the qualified alarm signal S3 are indicated below.

With reference to the application of a pipe for fluids (an oil pipeline, for example), the alarm signal S1 is a signal which in addition to the amplitude value, may be formed by a data array comprising the following fields:
- id=list of objects; each object contains the pressure values related to a station;
- type=type of technology used for the localization of the event;
- chainage=progressive distance in meters from the start of the oil pipeline;
- coordinates=latitude and longitude of the event;
- created_at=date of the event calculated by the system according to Standard ISO 8601. The format is YYYY-MM-DDThh:mm:ssZ (T is used as separator between the date and time, and Z indicates that the time is indicated in UTC);
- localization error=localization accuracy estimated in meters;
- station id=identifier of the station closest to the localized event.

With reference to the classification signal S2, such a signal is formed by a data array comprising the following fields:
- from =start of time interval;
- to =end of time interval;
- Categories=classification set of the ambient noise identified by the model (including confidence).

The qualified alarm signal S3 is a signal which, in addition to the amplitude value, may be formed by a data array comprising the following fields:
- id=list of objects; each object contains the pressure values related to a station;
- type=type of technology used for the localization of the event;
- chainage=progressive distance in meters from the start of the oil pipeline;
- coordinates=latitude and longitude of the event;
- created_at=date of the event calculated by the system according to Standard ISO 8601. The format is YYYY-MM-DDThh:mm:ssZ (T is used as separator between the date and time, and Z indicates that the time is indicated in UTC); localization error=localization accuracy estimated in meters;
- station id=identifier of the station closest to the localized event;
- Severity=Low|Medium|High;
- AudioCategory=Machine|Engine|Truck|Unknown| . . . .

Again, with reference to the example in FIG. 1, it should be noted that the aforesaid one or more acoustic-electric transducers of system 100 are microphones 20.

In a first embodiment, each microphone 20 is configured to define a first microphone coverage area inside which the attenuation of the one or more ambient audio signals associated with said at least one acoustic and/or vibrational anomaly is lower than 6 db.

In a particular embodiment, each microphone 20 is configured to define a second microphone coverage area inside which the attenuation of the one or more ambient audio signals associated with said at least one acoustic and/or vibrational anomaly is lower than 3 db.

Based on the above, those skilled in the art are able to assess the mutual distance and the distance from the pipe for fluids at which the microphones 20 of system 100 would be conveniently placed for monitoring the pipe itself.

Figure 2:
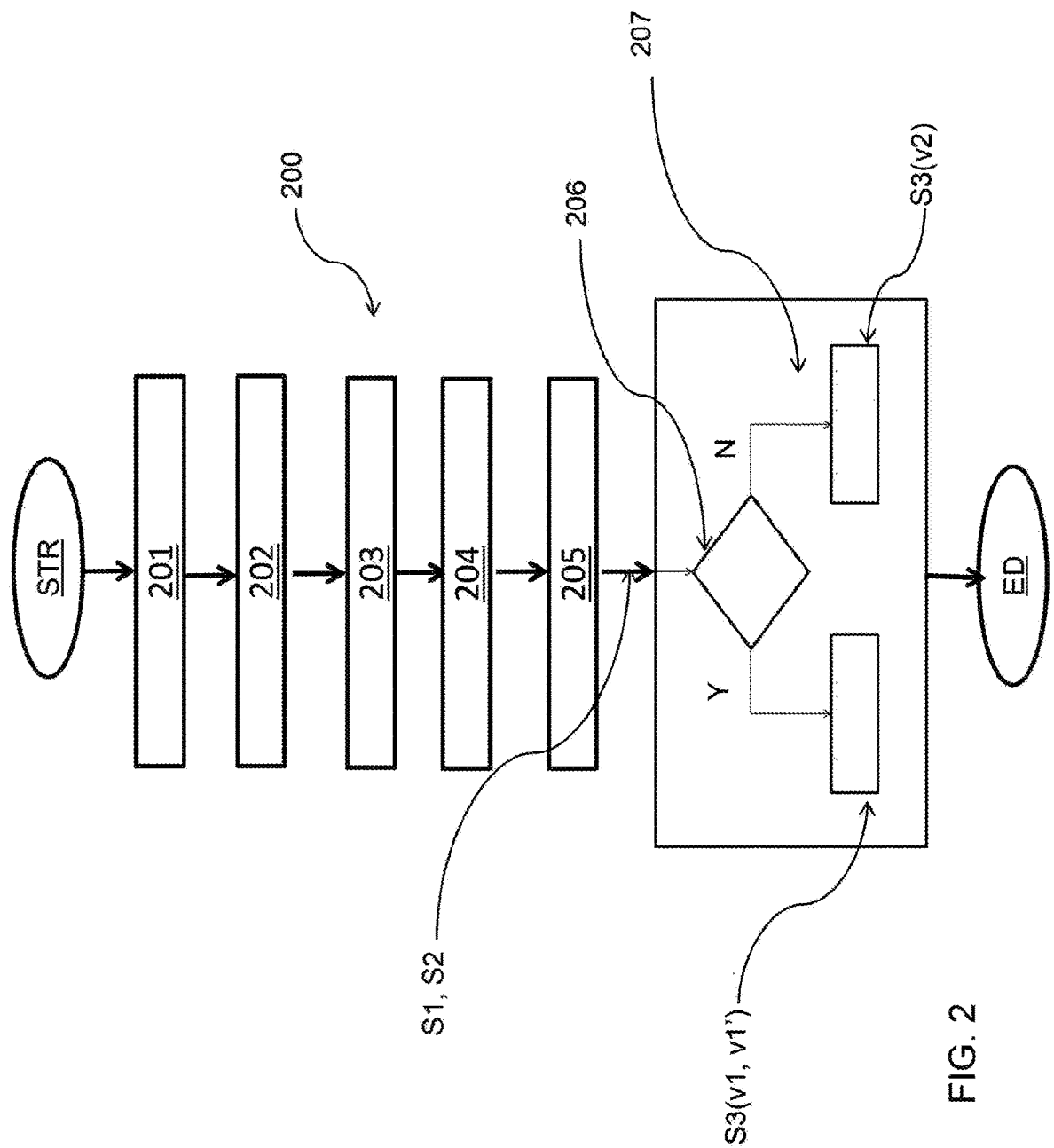
FIG. 2 uses a flow diagram to show the steps of a method for sensing and recognizing acoustic anomalies and/or vibrational anomalies implemented by the system in FIG. 1.

With reference to FIG. 2, a method 200 for sensing and recognizing acoustic anomalies and/or vibrational anomalies is described below, implemented by the system 100 of the invention described above.

Such a method 200 comprises a symbolic start step "STR" and a symbolic end step "ED".

In particular, such a method comprises a step of sensing 201 at least one acoustic and/or vibrational anomaly associated with the aforesaid site, in particular with the pipe for fluids, oil pipeline or gas pipeline.

The method 200 further comprises a step of generating 202 an alarm signal S1 representative of said at least one sensed acoustic and/or vibrational anomaly. These steps 201, 202 are carried out by the DAS/DVS unit 10 of system 100.

The method 200 then comprises a step of sensing 203 one or more ambient audio signals associated with said at least one sensed acoustic and/or vibrational anomaly. The conversion of the aforesaid ambient audio signals into electrical signals is also provided. This step is carried out by the microphones 20.

The method 200 further comprises a step of classifying 204 the electrical signals generated based on at least one algorithm for data analysis and machine learning of information from the data.

There is also provided a step of generating 205 a classification signal S2 indicative of the fact that the aforesaid at least one sensed acoustic and/or vibrational anomaly is included in a set of recognized anomalies or is an unknown acoustic and/or vibrational anomaly.

These steps 204, 205 are carried out by the audio classifier module 30 of system 100.

The method 200 further comprises a step of comparing 206, during a sensing time interval T1, T2, T3, the alarm signal S1 and the classification signal S2.

Based on such a comparison, the method 200 provides generating 207 a qualified alarm signal S3. Such a qualified alarm signal S3 is configured to provide coded information indicative of the fact that the alarm signal S1 represents, in the sensing time interval T1, T2, T3, a recognized acoustic and/or vibrational anomaly or an unknown acoustic and/or vibrational anomaly.

In an embodiment, the aforesaid step 207 comprises a step of generating a qualified alarm signal S3 with pulses of finite duration, in which each of such pulses takes, based on the classification signal S2:

a first amplitude value v1, v1', indicative of the fact that the alarm signal S1 is representative of a recognized acoustic and/or vibrational anomaly in the sensing time interval, for example in the first T1 or third T3 sensing time interval;

a second amplitude value v2, indicative of the fact that the alarm signal S1 is representative of an unknown acoustic and/or vibrational anomaly in the sensing time interval, for example in the second sensing time interval T2.

In an embodiment, the aforesaid step of classification 204 of the method 200 comprises a step of training the audio classifier module 30 of system 100 to recognize ambient audio signals as interference signals for the DAS/DVS unit 10 sensing the acoustic and/or vibrational anomalies associated with the site to be monitored.

An operating example of the audio classifier module 30 is indicated below.

Audio recordings are collected for each acoustic and/or vibrational anomaly to be classified. Each audio recording is divided into audio tracks lasting 32 ms. Audio features are extracted for each track, including:

Zero crossing rate,
Short-term energy,
Short-term entropy of energy,
Spectral centroid and spread,
Spectral entropy,
Spectral flux,
Spectral roll-off,
MFCC (Mel-frequency cepstral coefficients),
Chroma Features.

These features of the audio track are used to train the Machine Learning/Deep Learning model to recognize the single acoustic and/or vibrational anomalies.

For example, the models used comprise the Gaussian Mixture Model, or GMM, and the Supervised Learning Model (Neural Networks).

The GMM model is based on a statistical approach. A space with n-dimensions is created from the collection of the features contained in the audio track, in which each point represents the number of occurrences of that specific value of the feature carrier. Such a space substantially represents the model of the noise to be classified.

Moreover, the feature carriers are extracted for each track to be analyzed and the probability of the audio track being examined to belong to the individual class is established.

The Supervised Learning Model (Neural Networks) provides training a neural network using, as set of training data, the features extracted from the single audio tracks in addition to the label of the type of noise with which they are associated. The end results represent an audio track classifier based on neural networks.

The above-mentioned operating modes of the audio classifier module 30 are known in the prior art.

As indicated above, the system 100 and the related method 200 for sensing and recognizing acoustic anomalies and/or vibrational anomalies associated with a site to be monitored of the present invention have several advantages and achieve the preset purposes.

In particular, the suggested system 100 allows reducing the generation of alarms for false positives or false alarms by infrastructures using DAS/DVS units for sensing leaks (leak detection) used for monitoring oil pipelines and gas pipelines and based on the analysis of the acoustic/vibrational signals.

Moreover, the use of the system 100 of the invention in considerably anthropized areas avoids the DAS/DVS infrastructures which are not able to compensate for the interferences/disturbances resulting from human activities, from being deactivated in such areas in certain cases. This allows the infrastructure operator to save on costs which would be determined by such a deactivation, in addition to ensuring the monitoring of the entire oil pipeline/gas pipeline.

Those skilled in the art may make changes and adaptations to the embodiments of the system and method of the invention, or can replace elements with others which are functionally equivalent, in order to meet contingent needs, without departing from the scope of the following claims. All the features described above as belonging to a possible embodiment can be implemented irrespective of the other embodiments described.

The invention claimed is:

1. A system for sensing and recognizing acoustic anomalies and/or vibrational anomalies associated with a site to be monitored, comprising:
a unit using optical fiber for the distributed acoustic sensing, DAS, and/or for the distributed vibrational sensing, DVS, of at least one acoustic and/or vibrational anomaly associated with said site and for generating an alarm signal representative of the sensing of said at least one acoustic and/or vibrational anomaly;
one or more acoustic-electric transducers operatively associated with said site to be monitored to sense one or more ambient audio signals associated with said at least one acoustic and/or vibrational anomaly and to convert said ambient audio signals into electrical signals;
an audio classifier module connected to said one or more acoustic-electric transducers and configured to classify said electrical signals generated based on at least one algorithm for data analysis and machine learning of information from the data, to generate a classification signal indicative of the fact that said at least one sensed acoustic and/or vibrational anomaly is included in a set of recognized anomalies or is an unknown acoustic and/or vibrational anomaly;
a correlator module configured to receive said alarm signal and said classification signal and to compare, during a sensing time interval, said alarm signal and said classification signal to generate a qualified alarm signal, said qualified alarm signal being configured to provide coded information indicative of the fact that the alarm signal represents, in the sensing time interval, a recognized acoustic and/or vibrational anomaly or an unknown acoustic and/or vibrational anomaly.

2. A system for sensing and recognizing acoustic anomalies and/or vibrational anomalies according to claim 1, wherein said classification signal takes a discrete value between one and zero in the sensing time interval, indicative of a level of confidence in the classification, to determine whether said at least one sensed acoustic and/or vibrational anomaly is a recognized anomaly or is an unknown anomaly.

3. A system for sensing and recognizing acoustic anomalies and/or vibrational anomalies according to claim 1, wherein said at least one algorithm for data analysis and machine learning of information directly from the data comprises a Machine Learning and/or Deep Learning algorithm based on a Convolutional Neural Network (CNN).

4. A system for sensing and recognizing acoustic anomalies and/or vibrational anomalies according to claim 1, wherein said site to be monitored is a pipeline for the transport of fluids and gases selected from the group consisting of: oil pipeline, gas pipeline.

5. A system for sensing and recognizing acoustic anomalies and/or vibrational anomalies according to claim 1, wherein said one or more acoustic-electric transducers are microphones, each microphone being configured to define a first microphone coverage area inside which the attenuation of the one or more ambient audio signals associated with said at least one acoustic and/or vibrational anomaly is lower than 6 db.

6. A system for sensing and recognizing acoustic anomalies and/or vibrational anomalies according to claim 5, wherein each microphone is configured to define a second microphone coverage area inside which the attenuation of the one or more ambient audio signals associated with said at least one acoustic and/or vibrational anomaly is lower than 3 db.

7. A system for sensing and recognizing acoustic anomalies and/or vibrational anomalies according to claim 1, wherein said qualified alarm signal is a signal with pulses of finite duration, each of said pulses taking, based on the classification signal:
a first amplitude value, indicative of the fact that said alarm signal is representative of a recognized acoustic and/or vibrational anomaly in the sensing time interval;
a second amplitude value, indicative of the fact that said alarm signal is representative of an unknown acoustic and/or vibrational anomaly in the sensing time interval.

8. A system for sensing and recognizing acoustic anomalies and/or vibrational anomalies according to claim 7, wherein said first amplitude value of the qualified alarm signal with pulses of finite duration is:
a first amplitude when the classification signal takes a discrete value greater than 0.8 in the sensing time interval;
a further first amplitude when the classification signal takes a discrete value lower than 0.8 and greater than 0.5 in the sensing time interval.

9. A system for sensing and recognizing acoustic anomalies and/or vibrational anomalies according to claim 7, wherein the pulse of finite duration of the qualified alarm signal takes the second amplitude value when the classification signal takes a discrete value lower than 0.5 in the sensing time interval.

10. A system for sensing and recognizing acoustic anomalies and/or vibrational anomalies according to claim 7, wherein, following a failure of the correlator module to receive said classification signal, the correlator module is configured to generate the qualified alarm signal with pulses of finite duration, where each of said pulses takes said second amplitude value.

11. A system for sensing and recognizing acoustic anomalies and/or vibrational anomalies according to claim 7, wherein said first amplitude value of the qualified alarm signal with pulses of finite duration is lower than the second amplitude value.

12. The system for sensing and recognizing acoustic anomalies and/or vibrational anomalies according to claim 7, wherein said classification signal takes a discrete value between one and zero in the sensing time interval, indicative of a level of confidence in the classification, to determine whether said at least one sensed acoustic and/or vibrational anomaly is a recognized anomaly or is an unknown anomaly.

13. The system for sensing and recognizing acoustic anomalies and/or vibrational anomalies according to claim 7, wherein said first amplitude value of the qualified alarm signal with pulses of finite duration is:
a first amplitude when the classification signal takes a discrete value greater than 0.8 in the sensing time interval;
a further first amplitude when the classification signal takes a discrete value lower than 0.8 and greater than 0.5 in the sensing time interval.

14. A method for sensing and recognizing acoustic anomalies and/or vibrational anomalies associated with a site, said method comprising the steps of:

sensing at least one acoustic and/or vibrational anomaly associated with said site;

generating an alarm signal representative of said at least one sensed acoustic and/or vibrational anomaly;

sensing one or more ambient audio signals associated with said at least one sensed acoustic and/or vibrational anomaly and converting said ambient audio signals into electrical signals;

classifying said electrical signals generated based on at least one algorithm for data analysis and machine learning of information from the data;

generating a classification signal indicative of the fact that said at least one sensed acoustic and/or vibrational anomaly is included in a set of recognized anomalies or is an unknown acoustic and/or vibrational anomaly;

comparing, during a sensing time interval, said alarm signal and said classification signal;

generating a qualified alarm signal, said qualified alarm signal being configured to provide-coded information indicative of the fact that the alarm signal represents, in the sensing time interval, a recognized acoustic and/or vibrational anomaly or an unknown acoustic and/or vibrational anomaly.

15. A method for sensing and recognizing acoustic anomalies and/or vibrational anomalies according to claim 14, wherein said step of generating comprises a step of generating a qualified alarm signal with pulses of finite duration, each of said pulses taking, based on the classification signal:

a first amplitude value, indicative of the fact that said alarm signal is representative of a recognized acoustic and/or vibrational anomaly in the sensing time interval;

a second amplitude value, indicative of the fact that said alarm signal is representative of an unknown acoustic and/or vibrational anomaly in the sensing time interval (T2).

16. A method for sensing and recognizing acoustic anomalies and/or vibrational anomalies according to claim 14, wherein said step of classifying comprises a step of training an audio classifier module to recognize ambient audio signals as interference signals for a unit using optical fiber for the distributed acoustic sensing, DAS, and/or for the distributed vibrational sensing, DVS, of the acoustic and/or vibrational anomalies associated with said site to be monitored.

* * * * *